Sept. 15, 1931.  E. ROBERTS  1,823,863
DRIVING MOUNT FOR GYRATORY CENTRIFUGALS
Filed July 11, 1929
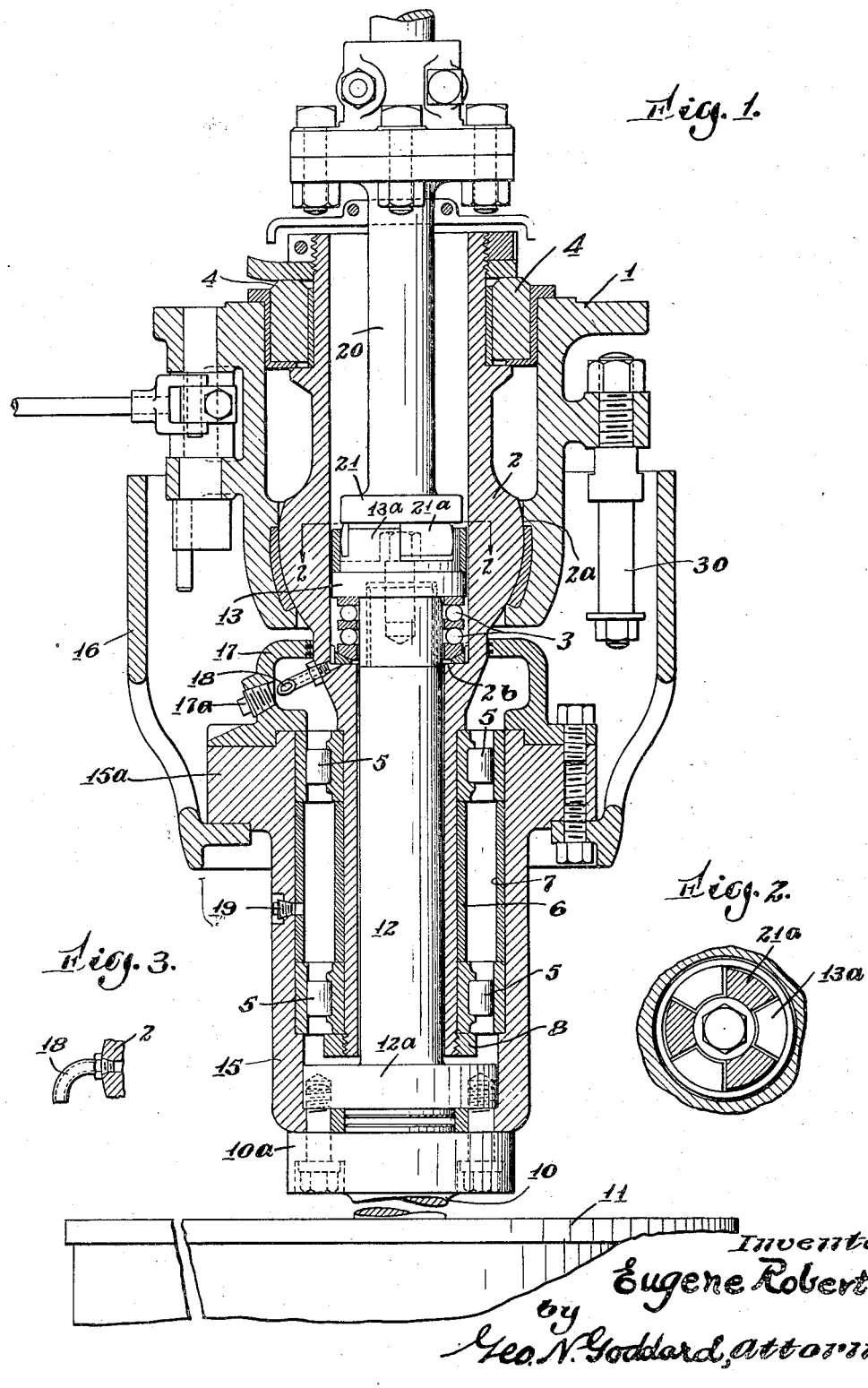

Patented Sept. 15, 1931

1,823,863

UNITED STATES PATENT OFFICE

EUGENE ROBERTS, OF HASTINGS, NEW YORK, ASSIGNOR TO THE WESTERN STATES MACHINE COMPANY, OF SALT LAKE CITY, UTAH, A CORPORATION OF UTAH

DRIVING MOUNT FOR GYRATORY CENTRIFUGALS

Application filed July 11, 1929. Serial No. 377,430.

This invention relates to centrifugal machines of the gyratory suspended type such as are commonly used in sugar refineries and the like for the centrifugal separation of the liquid content from sugar or similar solids, and is intended to provide a simple, inexpensive and highly efficient means for suspending said centrifugal to rotate with the minimum expenditure of power, while leaving it free to gyrate and centralize itself when running at high speed with heavy loads.

With these objects in view the invention comprises, generally speaking, the combination with a hollow non-rotating suspension head, provided with a gyration or spherical bearing intermediate of its ends and carrying an interior anti-friction thrust bearing for upper and lower exterior radial bearings, of a centrifugal basket-carrying shaft provided with inner and outer concentric upward extensions, the former of which is supported on said thrust bearing and the latter of which has bearing engagement with the exterior anti-thrust bearing elements which sustain the radial or lateral thrusts and through which the parallelism between the yieldingly centralized gyratory head and the basket suspending shaft is maintained at all times with the least possible disturbance from friction. Furthermore, direct circulation of the lubricating oil is maintained between the outer oil chamber, comprising the annular space between the outer extension of the basket shaft, and the lower portion of the gyratory head with the interior oil reservoir in which the thrust bearing is mounted by circulating oil duct leading through the side wall of the hollow head adjacent to the thrust bearing from the upper portion of the outer oil reservoir. These and other features of the invention will be particularly described in the following specification and will be defined in the claims hereto annexed.

In the accompanying drawings I have illustrated a simple construction and arrangement that possesses great convenience in assembling and disassembling embodying the principles of this invention.

Fig. 1 is a vertical central section showing the assemblage of the hanger suspension head, basket-carrying shaft and the interposed anti-friction bearing elements.

Fig. 2 is a cross sectional detail of the coupling between the gyratory basket shaft and the non-gyratory overhead driving shaft.

Fig. 3 is a horizontal section through one side of the gyratory head showing the oil duct affording direct communication between the two oil reservoirs in which the respective radial and thrust bearings are located.

In the practice of this invention according to the form illustrated in the drawings, I employ a well known type of socketed hanger 1 which at its lower end is provided with a spherically curved bearing seat or socket engaging the spherically curved suspension ball member $2^a$ formed on the exterior of the non-rotary gyratory head 2 intermediate of the ends thereof. This hollow gyratory suspension head is formed intermediate of its ends with an internal ledge $2^b$ on which is mounted an anti-friction rotary bearing element 3 which is to sustain the downward thrust or weight of the suspended centrifugal.

The lower portion of the hollow gyratory suspension head, that is the portion below the centre of gyration, is provided on its exterior with upper and lower anti-friction bearing elements 5, which are herein shown as comprising radial bearing rollers interposed between outer and inner annular races. The race rings of the two radial bearing elements are properly spaced apart by means of spacing sleeves or bushings 6 and 7 that are concentric with the axis of the basket shaft. A retaining nut or ring 8, threaded on the lower end of the exterior of the gyratory head, serves to clamp the bearings and the spacing rings securely in place.

The basket shaft 10, to whose lower end the centrifugal basket 11 is secured, is preferably provided at its upper end with a coupling flange $10^a$ to which is secured the flange $12^a$ of an upward inner shaft extension 12, to whose upper end is secured a supporting flange or thrust member 13 which rests upon the upper race of the anti-friction thrust bearing element 3. This flange or head 13, which sustains the weight of the machine, is provided with upwardly projecting sector teeth 13ª which interlock with corresponding sector teeth 21ª of the non-gyratory overhead driving shaft 20 to form a flexible coupling between the driving shaft and the centrifugal. This particular coupling, however, forms no part of the present invention and any suitable means may be employed for imparting rotation to the basket shaft.

To the flange 10ª of the basket shaft is securely fastened an upward hollow extension 15 that is concentric with the thrust sustaining shaft 12 and which is dimensioned to form an outer casing engaging the outer races of the anti-friction radial bearings 5. At its upper end this hollow basket shaft extension is provided with an exterior flange 15ª to facilitate bolting thereto a pulley 16 which forms the rotary element of a brake couple. Usually in this type of machines expanding brake shoes are mounted inside this pulley on fulcral supporting post 30, so that they may be expanded by any suitable means into braking engagement with the pulley but details of the brake mechanism are not herein shown as they form no part of the present invention. In the belt driven machine the brake pulley also serves as the driving belt pulley for the rotation of the centrifugal, but where an overhead driving shaft connected with the interior upward extension of the basket shaft is used, as here shown, the belt drive would be dispensed with.

It will of course be understood that the non-rotary gyratory suspension head 2 is yieldingly restrained against gyration by a centralizing buffer 4 interposed between the upper end of the head and the surrounding portion of the socketed hanger. The upper and lower spaced radial bearing members 5 serve to transmit the lateral pressure due to the swaying movement of the basket to the gyratory suspension head subject to the yielding resistance of the centralizing elastic buffer, so that the basket shaft is always maintained in parallelism with its gyratory supporting head. The direct oil circulating passage, which deliveres oil to the interior thrust bearing from the exterior oil chamber directly through the side wall of the hollow head, provides efficient means for maintaining a rapid circulation of oil while the shortness of the duct minimizes danger of clogging. This oil duct 18 is curved or bent to provide a scoop action and its inlet end is turned in the direction to receive the swirling oil carried in the rotary extension 15, so that the oil has always a direct forced circulation while the machine is running. The cap ring 17, whose top projects inward far enough to prevent the flow of oil over the top, is provided with an orifice normally closed by a sealing plug 17ª to afford access to the short removable circulating duct member 18 so that access is readily had to remove the oil duct and keep it clean and free from clogging.

What I claim is:

1. A driving mount for a gyratory centrifugal embracing in combination a non-rotary hollow suspension head supported to gyrate against yielding centralizing resistance and containing an interior anti-friction thrust bearing, said head carrying on its exterior anti-friction radial bearing elements, a rotary basket-carrying shaft having inner and outer concentric upward extensions, the inner extension having suspension support on said interior thrust bearing and serving to transmit rotation from overhead driving means and the outer extension having lateral engagement with the exterior of said radial bearing elements to maintain parallelism between the basket shaft and the suspension head as the centrifugal gyrates.

2. A driving mount for a gyratory centrifugal embracing in combination a non-rotary hollow suspension head supported on a spherical bearing intermediate of its ends to gyrate against yielding centralizing resistance, said head containing an interior anti-friction thrust bearing and carrying also axially spaced anti-friction radial bearing elements supported on its exterior below said spherical bearing, a rotary basket-carrying shaft having an upward extension provided with means for rotatably suspending the centrifugal on said thrust bearing and having also an outer hollow upward extension dimensioned to surround said radial bearing elements and have lateral supporting engagement therewith to transmit the gyratory motion of the basket shaft to the suspension head while transmitting the yielding resistance to gyration from the head to the basket shaft.

3. A driving mount for a gyratory centrifugal embracing a hollow suspension head suspended to gyrate on a spherical bearing intermediate of its ends, a yielding centralizing buffer surrounding the upper end of said head, exterior anti-friction radial bearings surrounding the lower portion of said head, a basket-carrying shaft rotatably suspended on an anti-friction thrust bearing mounted inside said head and having driving connection with an overhead driving shaft, an outer hollow extension member secured to the basket-carrying shaft and extending upward outside said radial bearings to have lateral bearing engagement therewith.

4. In a gyratory centrifugal the combination with a hollow gyratory bearing head containing an interior anti-friction thrust bearing adjacent its centre of gyration and having engagement with a yielding centralizing buffer at its upper end and carrying around the outside of that portion below the centre of gyration external anti-friction radial bearing elements, a suspended basket-carrying shaft rotatably supported upon said thrust bearing and laterally supported by said radial bearings, and driving means connected with the upper end of said driving shaft to rotate the basket.

5. In a gyratory centrifugal the combination with a hollow gyratory suspension head having an axial bore of two diameters, the larger uppermost, to leave an interior bearing ledge, an anti-friction thrust bearing element mounted on said ledge, radial bearing rollers carried on the outside of the lower portion of the suspension head, a rotary basket-carrying shaft having an outer upward extension surrounding and engaging the radial roller bearings and forming an oil reservoir for the lubrication of the rollers, an inner upward extension of said basket shaft being axially supported on said thrust bearing, said head being provided with an oil duct passing through the side wall of the head adjacent said thrust bearing to cause the flow of oil through the side wall directly to the thrust bearing.

6. In a gyratory centrifugal the combination with a gyratory non-rotating hollow suspension head, the upper portion of whose bore is enlarged to receive an anti-friction thrust bearing near the centre of gyration, a rotary basket-carrying shaft suspended on said thrust bearing, said basket shaft having also a hollow upward extension surrounding, and spaced from, that portion of the gyratory suspension head below its centre of gyration and forming an oil retaining reservoir, anti-friction lateral bearings located in said oil reservoir and interposed between the suspension head and the surrounding hollow extension member, an oil circulating tube secured in the side wall of the suspension head adjacent said thrust bearing to convey oil from the upper portion of said oil reservoir to the thrust bearing, said reservoir being provided with a sealed aperture for affording access to the oil circulating tube.

In witness whereof, I have subscribed the above specification.

EUGENE ROBERTS.